(12) United States Patent
Tanaka (10) Patent No.: US 7,821,563 B2
(45) Date of Patent: Oct. 26, 2010

(54) IMAGE PROCESSOR AND CONTROL METHOD

(75) Inventor: Kentaro Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 11/674,176

(22) Filed: Feb. 13, 2007

(65) Prior Publication Data

US 2007/0195354 A1 Aug. 23, 2007

(30) Foreign Application Priority Data

Feb. 20, 2006 (JP) .............................. 2006-043163

(51) Int. Cl.
H04N 5/22 (2006.01)

(52) U.S. Cl. .............................. 348/333.12; 348/333.05

(58) Field of Classification Search ............ 348/207.99, 348/222.1, 333.01, 333.02, 333.04, 333.05, 348/333.11, 333.12, 373, 374
See application file for complete search history.

(56) References Cited

U.S. PATENT DOCUMENTS

| | | | | |
|---|---|---|---|---|
| 4,719,524 | A * | 1/1988 | Morishima et al. | 360/73.05 |
| 6,919,927 | B1 * | 7/2005 | Hyodo | 348/333.02 |
| 7,355,620 | B2 * | 4/2008 | Ikehata et al. | 348/14.03 |
| 7,428,379 | B2 * | 9/2008 | Terai | 396/159 |
| 7,430,008 | B2 * | 9/2008 | Ambiru et al. | 348/333.12 |
| 7,433,546 | B2 * | 10/2008 | Marriott et al. | 382/305 |
| 7,495,659 | B2 * | 2/2009 | Marriott et al. | 345/173 |
| 7,499,040 | B2 * | 3/2009 | Zadesky et al. | 345/204 |
| 2002/0176016 | A1 * | 11/2002 | Misawa et al. | 348/333.01 |
| 2004/0046887 | A1 * | 3/2004 | Ikehata et al. | 348/333.12 |
| 2006/0152612 | A1 * | 7/2006 | Asada | 348/333.01 |

FOREIGN PATENT DOCUMENTS

| | | |
|---|---|---|
| JP | 03-189812 | 8/1991 |
| JP | 04-127312 | 4/1992 |
| JP | 2004-032345 A | 1/2004 |
| KR | 2004-0066259 A | 7/2004 |

OTHER PUBLICATIONS

The above reference was cited in a Feb. 27, 2008 Korean Office Action issued in the counterpart Korean Patent Application 10-2007-0016415, a copy of which is enclosed.
The above reference was cited in an Aug. 27, 2008 Korean Office Action that issued in Korean Patent Application 10-2007-0016415, a copy of which is enclosed.

* cited by examiner

Primary Examiner—Lin Ye
Assistant Examiner—Chriss S Yoder, III
(74) Attorney, Agent, or Firm—Cowan, Liebowitz & Latman, P.C.

(57) ABSTRACT

A control method for an image processor having an operation member and an image display unit that displays images, wherein it is determined whether a touch wheel button has been operated according to a first operation method or whether it has been operated according to a second operation method, wherein functions executable by instructions from the touch wheel button include a first function allocated if it is determined to be the first operation method and a second function allocated if it is determined to be the second operation method, and wherein an image is displayed in the first display mode on the display unit if it is determined to be the first operation method and an image is displayed in the second display mode different from the first display mode if it is determined to be the second operation method.

23 Claims, 9 Drawing Sheets

IMAGE PROCESSOR AND CONTROL METHOD

BACKGROUND OF THE INVENTION

1. Field of the Invention

The present invention relates to an image processor comprising a display unit that displays images and a control method therefor.

2. Description of the Related Art

In recent years, the field of electronic cameras and other portable electronic devices has seen a rise in demand for device miniaturization along with a wide variety of built-in functions. For this reason, various means have been proposed to make the devices smaller, reduce the number of operation members, and allocate a plurality of functions to each operation member (for instance, see Japanese Patent Laid-Open Nos. 04-127312 and 03-189812).

A conventional image pickup apparatus allocates different functions depending on the operation state of the image pickup apparatus, however, in such a case, the number of functions that can be allocated to the operation members in each operation state is limited by the number of the operation members. For this reason, the number of operation members is increased for the purpose of increasing the number of functions, or the idea of increasing the number of functions has been abandoned. If the number of operation members is increased, the size of each operation member is reduced so as to miniaturize the image pickup apparatus, which makes it difficult to operate. In addition, when a plurality of functions is allocated to each operation member, it is unclear which function is active in the current operation state, which makes it difficult to use.

SUMMARY OF THE INVENTION

The present invention has been made in consideration of the above situation and has as its object to inform the user of functions allocated to operation members in a readily intelligible manner along with increasing the number of functions that can be allocated to the operation members without increasing the number of the operation members.

According to the present invention, the foregoing object is attained by providing an image processing apparatus comprising: a display unit that displays an image, an operation member to which a plurality of different functions are allocated respectively in accordance with a plurality of different operation methods, and a controller that exercises control such that when the operation member is operated according to a first operation method among the plurality of operation methods, an image is displayed on the display unit in a first display mode, and when the operation member is operated according to a second operation method, an image is displayed on the display unit in a second display mode different from the first display mode.

According to the present invention, the foregoing object is also attained by providing a control method for an image processing apparatus having an operation member and a display unit that displays images, the control method comprising: a determination step of determining whether the operation member has been operated according to a first operation method or whether it has been operated according to a second operation method different from the first operation method, a function allocation step of allocating functions executable by instructions from the operation member, including a first function, which is allocated if it is determined to be the first operation method, and a second function, different from the first function, which is allocated if it is determined to be the second operation method, a first display step of displaying an image in the first display mode on the display unit if it is determined to be the first operation method, a second display step of displaying an image in the second display mode different from the first display mode if it is determined to be the second operation method.

Further, features of the present invention will become apparent from the following description of exemplary embodiments with reference to the attached drawings.

DESCRIPTION OF THE EMBODIMENTS

Preferred embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

Figure 1:
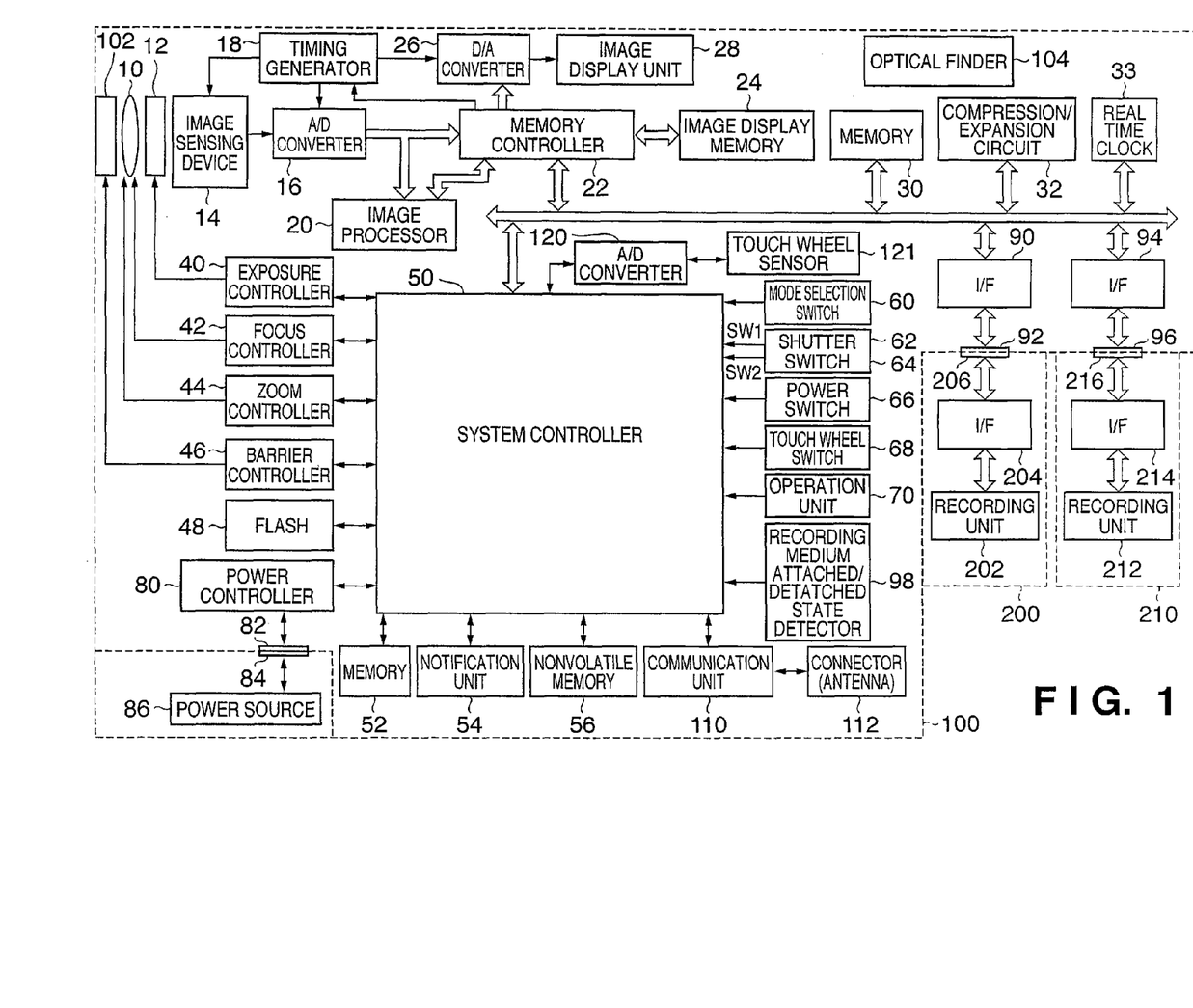
FIG. 1 is a block diagram illustrating the configuration of an image pickup apparatus according to an embodiment of the present invention.

FIG. 1 is a block diagram showing a configuration of an image pickup apparatus having image processing function according to an embodiment of the present invention.

In FIG. 1, reference numeral 100 denotes an image sensing. Reference numeral 10 denotes an image sensing lens; 12, a shutter having a diaphragm function; 14, an image sensing device which converts an optical image into an electric signal; 16, an A/D converter which converts an analog signal output from the image sensing device 14 into a digital signal; 18, a timing generator which supplies a clock signal and a control signal respectively to the image sensing device 14, the A/D converter 16 and a D/A converter 26, under the control of a memory controller 22 and a system controller 50.

Reference numeral 20 denotes an image processor which performs predetermined pixel interpolation processing, color conversion processing and the like on image data from the A/D converter 16 or image data from the memory controller 22. The image processor 20 performs predetermined calculation processing using the image data outputted from the A/D converter 16, and the system controller 50 performs through-the-lens (TTL) auto focus (AF) processing, auto exposure (AE) processing, pre-flash (EF) processing with respect to an exposure controller 40 and a focus controller 42, based on the result of calculations. Further, the image processor 20 performs predetermined calculation using the image data outputted from the A/D converter 16, and performs TTL auto white balance (AWB) processing, based on the result of calculations.

The memory controller 22 controls the A/D converter 16, the timing generator 18, the image processor 20, an image display memory 24, the D/A converter 26, a memory 30 and a compression/expansion circuit 32. The image data outputted from the A/D converter 16 is written into the image display memory 24 or the memory 30 via the image processor 20 and the memory controller 22, or only via the memory controller 22.

Reference numeral 24 denotes an image display memory; 26, the D/A converter; and 28, an image display unit comprising an LCD (Liquid Crystal Display) or the like. Image data written into the image display memory 24 is displayed on the image display unit 28 via the D/A converter 26. An electronic view finder (EVF) function is realized by sequentially displaying obtained images on the image display unit 28. Further, the image display unit 28 arbitrarily turns ON/OFF its display, in accordance with an instruction from the system controller 50. If the display is turned OFF, the electric consumption of the image pickup apparatus 100 can be greatly reduced.

The memory 30, used for storing obtained still images and moving images, has a sufficient storage capacity for storing a predetermined number of still images and a moving image for a predetermined period. In continuous shooting to sequentially obtain a plural number of still images or panoramic images sensing, a large amount of image data can be written into the memory 30 at a high speed. Further, the memory 30 may be used as a work area for the system controller 50, and may store constants, variables, programs, and the like, for operation of the system 50.

The compression/expansion circuit 32 compresses or expands image data by using a known compression methods, such as adaptive discrete cosine transformation (ADCT) or the like. The compression/expansion circuit 32 reads image data stored in the memory 30 and performs compression or expansion processing on the read image data, and writes the processed data into the memory 30.

Reference numeral 33 denotes a real time clock capable of measuring real time such as date and time. The real time clock 33 has a power source independently of power source 86, which will be explained later, for the image pickup apparatus 100, and can keep operating while the power source 86 is off.

The exposure controller 40 controls the shutter 12 having the diaphragm function. The exposure controller 40 interlocked with a flash 48 also has a flash adjusting function. The focus controller 42 controls focusing of the image sensing lens 10. Reference numeral 44 denotes a zoom controller which controls zooming of the image sensing lens 10. Reference numeral 46 denote a barrier controller which controls the operation of a barrier 102. The flash 48 has an AF auxiliary light projection function and a flash adjusting function. The system controller 50 controls the exposure controller 40 and the focus controller 42 by the TTL method, in accordance with the result of calculations by the image processor 20 based on the image data from the A/D converter 16.

The system controller 50 controls the overall image pickup apparatus 100. Memory 52 stores the constants, variables, and programs for operation of the system controller 50.

Reference numeral 54 denotes a notification unit which notifies operating statuses, messages and the like to the outside by using characters, images, sound and the like, in correspondence with execution of program by the system controller 50. The notification unit 54 comprises one or more combinations of display devices including an LCD and an LED for visual notification and sound generating devices for audio notification. Especially, the display device or devices is/are provided in a single or plural visually-recognizable positions around an operation unit 70 of the image pickup apparatus 100. Further, a part of functions of the notification unit 54 is provided within an optical finder 104.

The display contents of the notification unit 54, displayed on the LCD or the like, include: display relating to shooting mode, such as indication of single shot/continuous shooting, and a self timer; display relating to recording, such as a compression rate, the number of recording pixels, the number of recorded images, and the number of recordable images; display relating to image sensing conditions, such as a shutter speed, an f number (aperture), exposure compensation, flash illumination, and red-eye reduction; and other display, such as macro image sensing, a buzzer-set state, a timer battery level, a battery level, an error state, information of plural digit numbers, attached/detached status of recording media 200 and 210, operation of communication I/F, and date and time.

Further, the display contents of the notification unit 54, displayed within the optical finder 104, include a focus state, an image sensing ready state, a camera shake warning, a flash charge state, the shutter speed, the f number (aperture), the exposure compensation, and recording medium write operation.

Furthermore, the display contents of the notification unit 54, displayed by LED or the like, include a focus state, an image sensing ready state, a camera shake warning, a flash charge state, a flash charge completion, recording medium write operation, macro image sensing setting notification, and a secondary battery chare state.

Further, the display contents of the notification unit 54, displayed by lamp or the like, include self-timer notification. The self-timer notification lamp may be also used as the AF auxiliary light.

Reference numeral 56 denotes an electrically erasable and recordable nonvolatile memory such as an EEPROM.

Reference numerals 60, 62, 64, 68, 70 and 121 denote operation means for inputting various operation instructions to the system controller 50, comprising a single or plurality of combinations of switches, dials, touch panels, a device for pointing by line-of-sight detection, a voice recognition device, and the like.

Next, the operation means will be described in more detail.

Reference numeral 60 denotes a mode selection switch for selecting various function modes such shooting mode, playback mode, and print service mode.

Reference numeral 62 denotes a shutter switch SW1 turned ON by the first stroke (e.g., half stroke) of a shutter button (not shown), to instruct start of the operations of the AF processing, the AE processing, the AWB processing, the EF processing and the like.

Numeral 64 denotes a shutter switch SW2 turned ON by the second stroke (e.g., full stroke) of the shutter button (not shown), to instruct start of a series of operations of exposure processing to write a signal read from the image sensing device 14 into the memory 30, via the A/D converter 16 and the memory controller 22, development processing by using calculations by the image processor 20 and the memory controller 22, and recording processing to read the image data from the memory 30, compress the image data by the compression/expansion circuit 32, and write the compressed image data into the recording medium 200 or 210.

A power switch 66 can set ON/OFF of the image pickup apparatus 100. The power switch 66 can also set ON/OFF of various additional devices connected to the image pickup apparatus.

Reference numeral 68 denotes a press-down switch (touch wheel switch) included in a touch wheel button. The touch wheel switch 68 is an operation member for detecting that the touch wheel button is pressed down.

Reference numeral 121 denotes a sensor member (touch wheel sensor) included in the touch wheel button. The touch wheel sensor 121 outputs touching state and touching position of the touch wheel button to the system controller as analog voltage via the A/D converter 120. The system controller 50 detects the change in toughing state and touching position on the basis of the information obtained from the touch wheel sensor 121.

Reference numeral 70 denotes an operation unit comprising various buttons and touch panels including a menu button, a function selection button, a set button, a macro button, a multi-image playback/repaging button, a flash set button, a single-shot/sequential/self-timer image sensing selection button, a forward (+) menu item selection button, a backward (−) menu item selection button, a forward (+) playback image search button, a backward (−) playback image search button, an image sensing quality selection button, an exposure correction button, a date/time set button, an image display ON/OFF button, a compression mode switch, a quick review switch for a setting quick review function for automatic playback of image data on the image display unit 28 right after an image sensing operation, a selection/changeover switch for setting selection and changeover of various functions when performing image sensing and/or playback and/or communication, and a set/return switch for setting the selection and execution of the various functions when performing image sensing and/or playback and/or communication.

Reference numeral 80 denotes a power controller comprising a battery detection circuit, a DC-DC converter, a switch circuit to select the block to be energized and the like. The power controller 80 detects the attached/detached state of the battery, the battery type and the remaining battery power level, controls the DC-DC converter based on the results of detection and an instruction from the system controller 50, and supplies a necessary voltage to the respective parts including the recording medium for the necessary period.

Reference numerals 82 and 84 denote connectors; and 86, the power source comprising a primary battery such as an alkaline battery or a lithium battery, a secondary battery such as an NiDd battery, an NiMH battery, an Li-ion battery, or an Li polymer battery, an AC adapter, or the like.

Reference numerals 90 and 94 denote interfaces for recording media such as a memory card or a hard disk; and 92 and 96, connectors for connection with the recording media such as a memory card or a hard disk. A recording medium attached/detached state detector 98 detects whether recording medium 200 and/or 210 is attached to the connector 92 and/or connector 96.

In the present embodiment, two systems of interfaces and connectors for connection with the recording media are employed. However, the number of systems is not limited, and a single or plurality of systems of interfaces and connectors may be provided. Further, interfaces and connectors pursuant to different standards may be combined.

As the interfaces and connectors, those in conformity with Personal Computer Memory Card International Association standards (PCMCIA cards), those in conformity with compact flash (CF) (registered trademark) card standards, SD card standards may be used. In a case where interfaces and connectors in conformity with the PCMCIA standards, CF (registered trademark) card standards and the like are used as the interfaces 90 and 94 and the connectors 92 and 96, various communication cards can be connected. The communication cards include a LAN card, a modem card, a USB (Universal Serial Bus) card, an IEEE (Institute of Electrical and Electronic Engineers) 1394 card, a P1284 card, an SCSI (Small Computer System Interface) card and a PHS card. Image data and management information attached to the image data are transmitted/received with respect to other peripheral devices such as a computer and a printer by connection with these various communication cards.

The barrier 102 covers the image sensing portion of the image pickup apparatus 100 including the lens 10, thus prevents dirt and breakage of the image sensing portion.

The optical finder 104 can be used for image sensing without the electronic view finder function by the image display unit 28. In the optical finder 104, realized are some of the functions of the notification unit 54 including the indication of focus state, the camera shake warning, the flash charge state, the shutter speed, the f number (aperture), the exposure compensation and the like.

A communication unit 110 has various communication functions, such as wireless communication using radio wave, wired communication, optical communication, and infrared communication such as IrDA (Infrared Data Association). For the wireless communication, wireless communication function such as Bluetooth and portable telephone communication functions may be accommodated. The portable telephone communication functions include those of TDMA (Time Divisional Multiple Access) method, CDMA (Code Division Multiple Access) method, and PHS (Personal Handyphone System) method. The wired communication function include those conform to RS232C, USB, IEEE 1394, P1284, SCSI, modem, and LAN (Local Area Network).

Reference numeral 112 denotes an antenna for wireless communication or a connector for wired communication for connecting the image pickup apparatus 100 to other devices, such as an image information management apparatus (image gate way), through the communication circuit 110 via an network, such as an packet network, Internet, or the like.

Each of the recording media 200 and 210 comprises a memory card, a hard disk or the like. The recording media 200 and 210 have recording units 202 and 212 of semiconductor memory, magnetic disks or the like, the interfaces 204 and 214 to the image pickup apparatus 100, and the connectors 206 and 216 for connection with the image pickup apparatus 100, respectively.

The recording media 200 and 210 may also configured as PCMCIA cards, memory cards such as CF cards (registered trademark), hard disks, micro DAT, magneto optical disks, optical disks such as CD-R and CD-WR, and phase-change optical disks such as DVD.

First Embodiment

Explanations addressed to processing performed by the image pickup apparatus 100 of the above-described configuration in the first embodiment of the present invention are provided below.

FIG. 2A-FIG. 2E provide an example illustrating the layout of the rear face of the image pickup apparatus 100 depicted in FIG. 1, with the same reference numbers applied to the same constituent parts as the constituent parts shown in FIG. 1.

As shown in FIG. 2A-FIG. 2E, the optical finder 104, the mode selection switch 60, a menu display button 34, a function selection button 35, a touch wheel button 36, and the image display unit 28 (for instance, an LCD display panel) are disposed on the rear face 300 of the image pickup apparatus 100. It should be noted that the menu display button 34 and function selection button 35 constitute part of the operation unit 70 of FIG. 1.

Figure 2A:
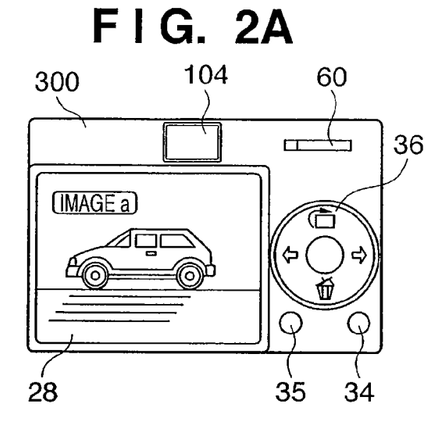
FIGS. 2A-2E are diagrams showing the rear face of the image pickup apparatus and examples of images displayed on a display unit according to the first embodiment of the present invention.
Figure 2B:
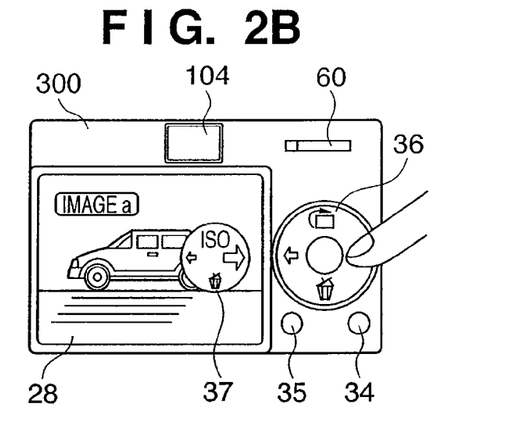
Figure 2C:
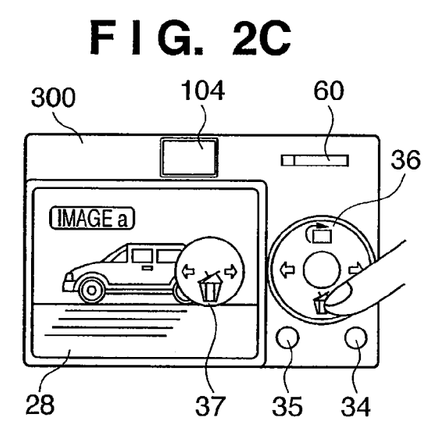
Figure 2D:
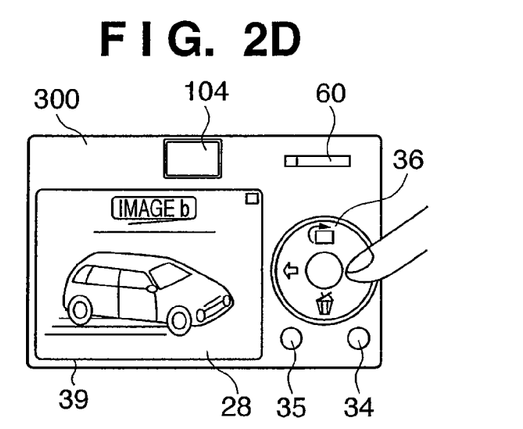
Figure 2E:
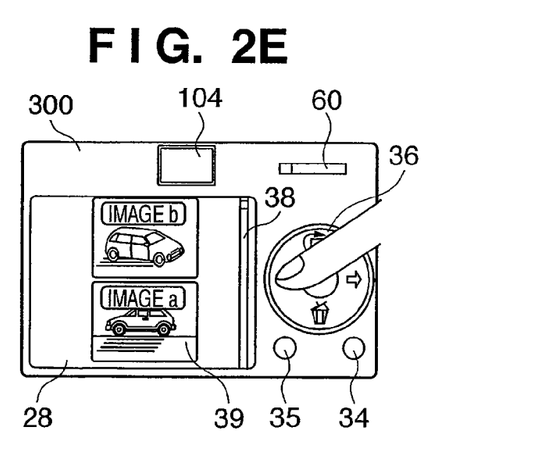
Figure 3:
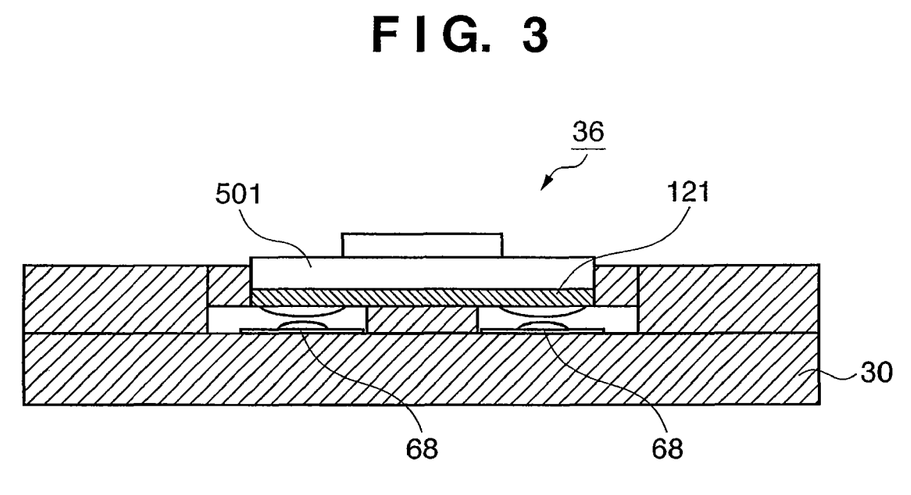
FIG. 3 is a cross-sectional view of the touch wheel button according to the first embodiment of the present invention.

FIG. 3 is a cross-sectional view of the touch wheel button 36. As shown in FIG. 2A-FIG. 2E, the touch wheel button 36 is located on the rear face 300 of the image pickup apparatus 100. The touch wheel button 36 includes an operation member 501, the touch wheel switch 68, and the touch wheel sensor 121. It should be noted that when the operation member 501 is touched by a finger etc., the touch wheel sensor 121 outputs its status, position, etc. to the system controller 50 via the A/D converter 120 as an electrical signal. In a similar manner, when the operation member 501 is pressed by a finger etc., the touch wheel switch 68 outputs its status to the system controller 50 as an electrical signal.

FIG. 4-FIG. 8 are flow charts illustrating the operation of the image pickup apparatus 100 in the first embodiment.

Figure 4:
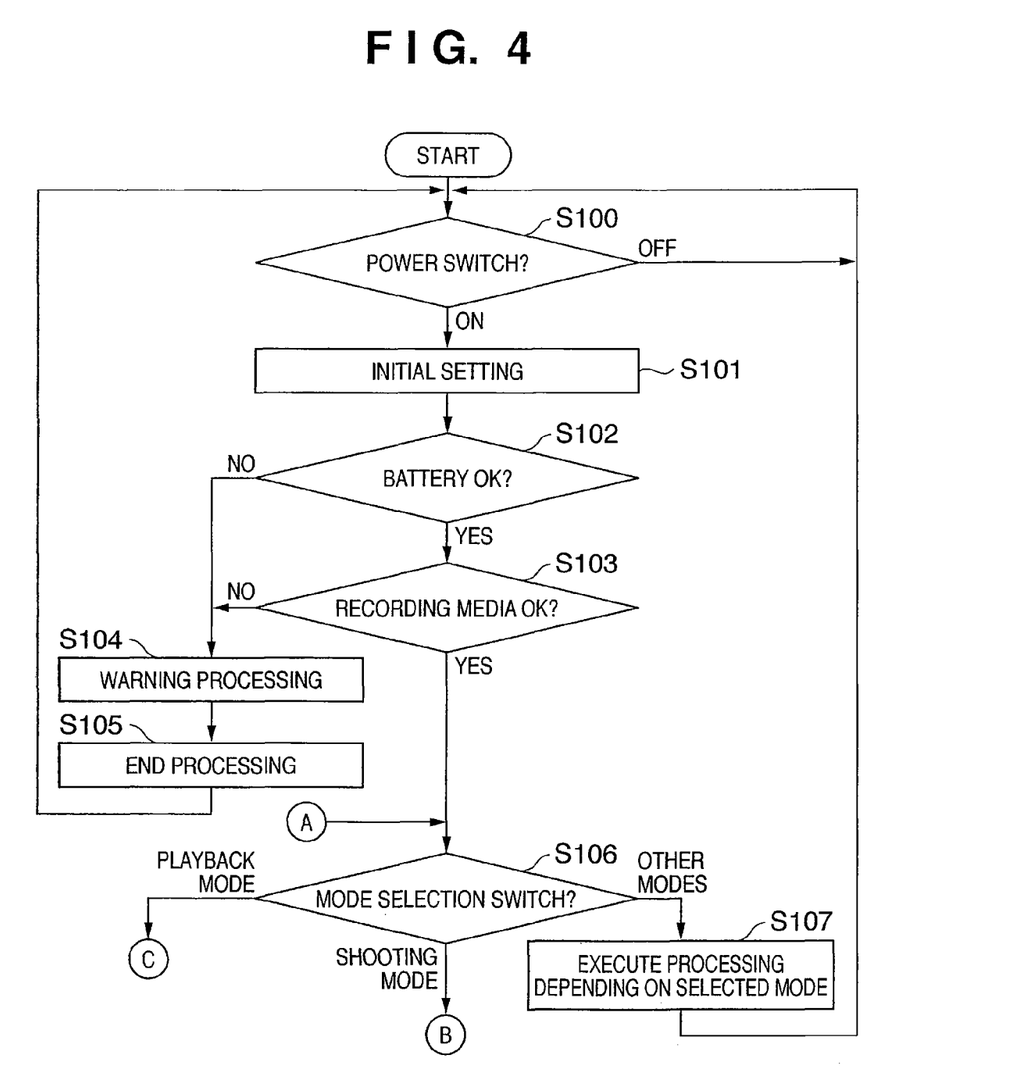
FIG. 4 is a flow chart of the main sequence according to the first embodiment of the present invention.

First of all, if the power switch 66 is thrown to the "Power ON" position in step S100 of FIG. 4, the system controller 50 performs initialization processing for all parts of the image pickup apparatus 100 along with initializing flags, control variables, and the like (step S101).

On the other hand, if the power switch 66 is thrown to the "Power OFF" position in step S100, the program returns to step S100 and repeats step S100 until the power switch 66 is thrown to the "Power ON" position.

Next, in step S102, the system controller 50 uses a power controller 80 to determine whether the residual capacity and operative condition of the power source 86, which is made up of a battery etc., present problems for the operation of the image pickup apparatus 100. If there are problems ("NO" in step S102), a specified warning indication is given visually or by sound using the image display unit 28 and notification unit 54 (step S104) and specified end processing is carried out (step S105), whereupon the program returns to step S100. During the end processing in step S105, the display of the image display unit 28 and notification unit 54 is changed to an end state display. Furthermore, the image sensing unit is protected by closing the barrier 102 and the status of the guidance display setting flags, setting mode, settings and required parameters including flags, control variables, etc. are recorded in a non-volatile memory 56. Furthermore, processing that shuts off unnecessary power to the components of the image pickup apparatus 100 including the image display unit 28 is carried out by the power controller 80.

On the other hand, if there are no problems with the power source 86 ("YES" in step S102), the system controller 50 determines whether the operation state of the recording media 200 or 210 presents problems for the operation of the image pickup apparatus 100, in particular, for the operation of recording and playback of image data on the recording media 200 or 210. If there are problems ("NO" in step S103), a specified warning indication is given visually or by sound using the image display unit 28 and notification unit 54 (step S104) and the above-described specified end processing is carried out (step S105), whereupon the program returns to step S100.

If there are no problems in terms of the operation state of the recording media 200 or 210 ("YES" in step S103), the program proceeds to step S106.

Figure 5:
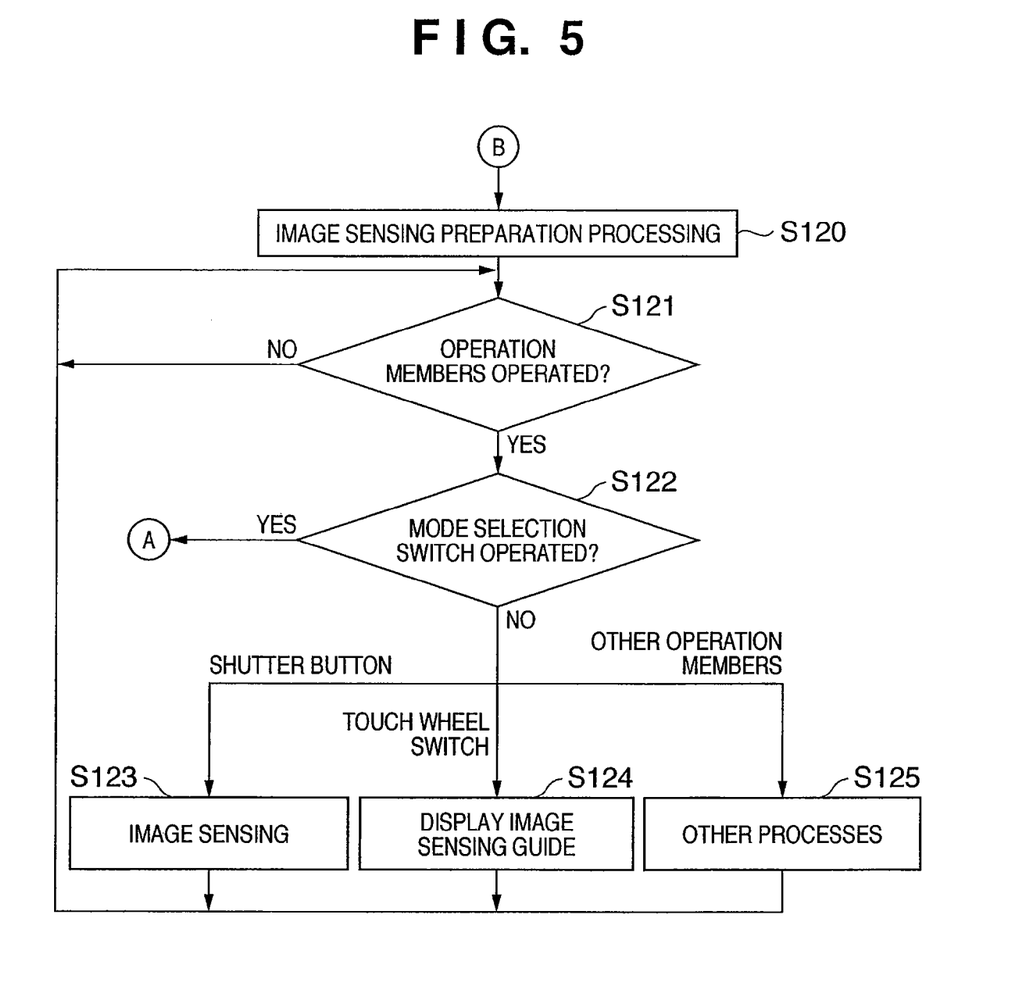
FIG. 5 is a flow chart illustrating processing in shooting mode according to the first embodiment of the present invention.
Figure 6:
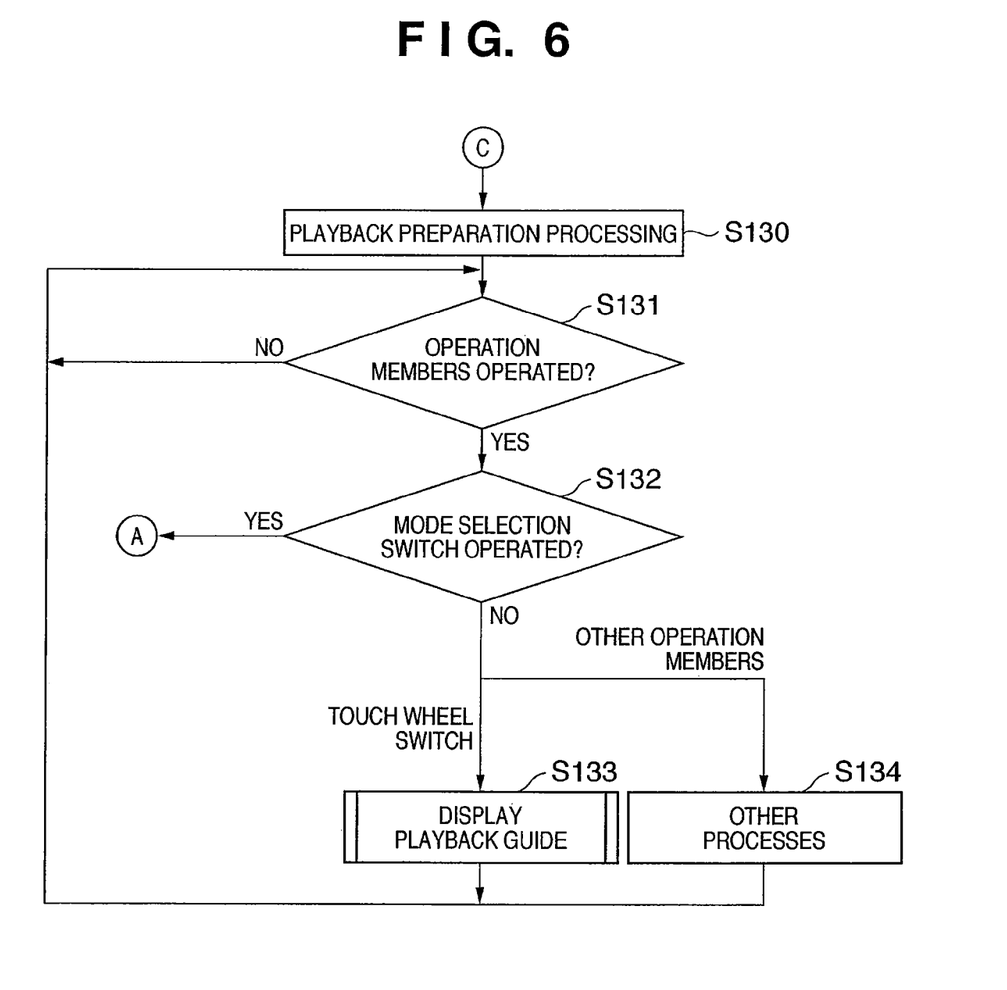
FIG. 6 is a flow chart illustrating processing in playback mode according to the first embodiment of the present invention.

In step S106 the program confirms the set status of the mode selection switch 60 and, if it has been set to shooting mode, the program proceeds to step S120 in FIG. 5, and if it has been set to playback mode, to step S130 in FIG. 6. If it is neither (for instance, print service mode), the program performs corresponding processing in step S107 and then returns to step S100.

Explanations addressed to the operation of the image pickup apparatus 100 when it is set to shooting mode using the mode selection switch60 are provided below with reference to FIG. 5.

In step S120, the system controller 50 carries out image sensing preparation processing. During the image sensing preparation processing, the apparatus performs initialization processing required for image sensing including, for instance, processing such as lens barrel extension, application of electric power to the image display unit 28, file initialization in the recording units 202 and 212, and startup screen/startup sound initialization, etc.

Next, the system controller 50 proceeds to step S121 and determines whether operation members such as the mode selection switch60, shutter button, touch wheel button 36, etc. have been operated. If they haven't been operated, the processing of step S121 is repeated. If they have been operated, then, in step S122, it is determined whether the operated operation member is the mode selection switch60 and, if it is the mode selection switch60 ("YES" in step S122), the program returns to step S106 of FIG. 4. If the operated operation member is not the mode selection switch60 ("NO" in step S122), then the function allocated to the operated operation member is carried out. If the shutter button has been pressed, an image sensing process is carried out in step S123 and, if the touch wheel button 36 has been operated, a guide display for functions allocated to the touch wheel button 36 in the shooting mode is displayed in step S124. If an operation member other than the above-mentioned ones has been operated, the corresponding processing is carried out in step S125. When the processing of any of Steps S123-S125 is complete, the program returns to step S121.

Explanations addressed to the operation of the image pickup apparatus 100 when it is set to playback mode using the mode selection switch60 are provided below with reference to FIG. 6.

In step S130, the system controller 50 carries out playback preparation processing. During the playback preparation process, the apparatus performs initialization processing necessary for playback including, for instance, processing such as application of electric power to the image display unit 28, file initialization in the recording units 202 and 212, and startup screen/startup sound initialization, etc.

Next, the system controller 50 proceeds to step S131 and determines whether operation members, such as the mode selection switch60, shutter button, touch wheel button 36, etc. have been operated. If they haven't been operated, the processing of step S131 is repeated. If they have been operated, then, in step S132, it is determined whether the operated operation member is the mode selection switch60 and, if it is the mode selection switch60 ("YES" in step S132), the program returns to step S106 of FIG. 4. If the operated operation member is not the mode selection switch60 ("NO" in step S132), the function allocated to the operated operation member is carried out. If the touch wheel button 36 has been operated, a guide display for functions allocated to the touch wheel button 36 in the playback mode is displayed in step S133. It should be noted that the guide display process performed in the playback mode in step S133 (referred to as "playback guide display process" below) will be explained in detail later with reference to FIG. 7. In addition, if the operated operation member is an operation member other than the touch wheel button 36, the corresponding processing is carried out in step S134. When the processing of any of Steps S133 or S134 is complete, the program returns to step S131.

Next, the playback guide display process carried out in step S133 will be explained in detail with reference to the flow chart of FIG. 7.

First of all, in step S150, the program checks whether any image file is present on the recording media 200 or 210 and, if such file is present, arbitrarily selected an image/images from the recording media 200 or 210 are displayed using the image display unit 28 in step S151. Here, the state of the display of the image display unit 28 is, for example, as shown in FIG. 2A.

If there are no image file on the recording media 200 and 210, a message to that effect, such as "no image", is displayed on the image display unit 28 in step S152.

Next, in step S153, the system controller 50 reads the value of the touch wheel sensor 121 and determines whether the touch wheel button 36 has been touched by a finger.

If the system controller 50 determines that the touch wheel button 36 has not been touched by a finger, the program returns to step S150. On the other hand, if it determines that it has been touched by a finger, the program proceeds to step S154 and displays a function guide 37 depicting functions allocated to the touch wheel button 36 in the playback mode on the image display unit 28. While there are no particular limitation concerning the layout of the function guide 37, a more intelligible display can be produced by designing the layout of the function guide 37 in imitation of the layout of the touch wheel button 36.

If images recorded on recording media 200 or 210 were displayed in step S151, then the function guide 37 is superimposed on these images when the function guide 37 is displayed. In such a case, the state of the display of the image display unit 28 is, for example, as shown in FIG. 2B. In addition, if a message was displayed in step S152, the function guide is superimposed on the message. It should be noted that a more intelligible display can be produced by enhancing the display of the location touched by the finger on the touch wheel button 36 in the display of the superimposed function guide 37 in step S154. For instance, because the finger touches the right-hand side of the touch wheel button 36 in FIG. 2B, the function located on the right-hand side (right arrow) is enhanced by displaying them in enlarged form. It should be noted that the method of enhancement is not limited to the displayed size, and may consist in providing emphasis in comparison with other locations by changing colors, brightness, etc.

Next, in step S155, the system controller 50 reads the value of the touch wheel switch 68 and determines whether the operation member 501 of the touch wheel button 36 further has been pressed. Here, if it is determined that the member has been pressed, the program proceeds to step S156, and if it is determined that it has not been pressed, to step S158.

In step S156, the system controller 50 erases the display of the function guide 37 from the image display unit 28 and, in step S157, executes the function of the pressed key. For instance, if the operation member 501 is further pressed in the state depicted in FIG. 2B (the state, in which the finger touches the right arrow), the image forwarding function is carried out and the displayed image file is switched from image a to image b. As a result of the switch, the state of the display of the image display unit 28 changes, for example, to what is shown in FIG. 2D. After executing the function of the pressed key in step S157, the system controller 50 terminates the playback guide display process.

On the other hand, in step S158, the system controller 50 reads the value of the touch wheel sensor 121 and determines whether the finger has been removed from the touch wheel button 36. If the system controller 50 determines that the finger has been removed from the touch wheel button 36, it stores the current time in the memory 30 and proceeds to step S159, and if it is in continuous contact, to step S163.

In step S159, based on the finger removal timing stored in the memory 30, the system controller 50 determines whether a fixed amount of time has elapsed since the removal of the finger from the touch wheel button 36. If the fixed amount of time has elapsed, the program proceeds to step S160 and erases the function guide display.

On the other hand, if it is determined that the fixed amount of time has not elapsed, the program proceeds to step S161 and determines whether the finger has touched the touch wheel button 36. If it has touched it, the program returns to step S154. Here, the display of the function guide 37 is modified to enhance the display of the locations newly touched by the finger on the touch wheel button 36 (for instance, FIG. 2C). In addition, if the finger is not touching the touch wheel switch 68, the program returns to step S159 and determines the elapsed time.

If it is determined in step S158 that the finger has not been removed from the touch wheel button 36, the program proceeds to step S163, the system controller 50 reads the value of the touch wheel sensor 121 and determines whether the position of the finger has been shifted. If the system controller 50 determines that the finger has not moved on the touch wheel button 36 ("NO" in step S163), the program returns to step S155.

On the other hand, if it is determined that the finger has moved ("YES" in step S163), the program proceeds to step S164. In step S164, the system controller 50 reads the value of the touch wheel sensor 121 again and determines whether the finger has continuously moved through 180° or more on the touch wheel button 36. If it is determined that the finger has moved through 180° or more on the touch wheel button 36, the program proceeds to step S165, makes a transition to the image forwarding mode and terminates the process.

In addition, if in step S164 it is determined that the finger has not moved through 180° or more on the touch wheel button 36, the program returns to step S154. Here, the display of the function guide 37 is changed to an image providing an enhanced display of the locations newly touched by the finger on the touch wheel button 36 (for instance, FIG. 2C).

Figure 7:
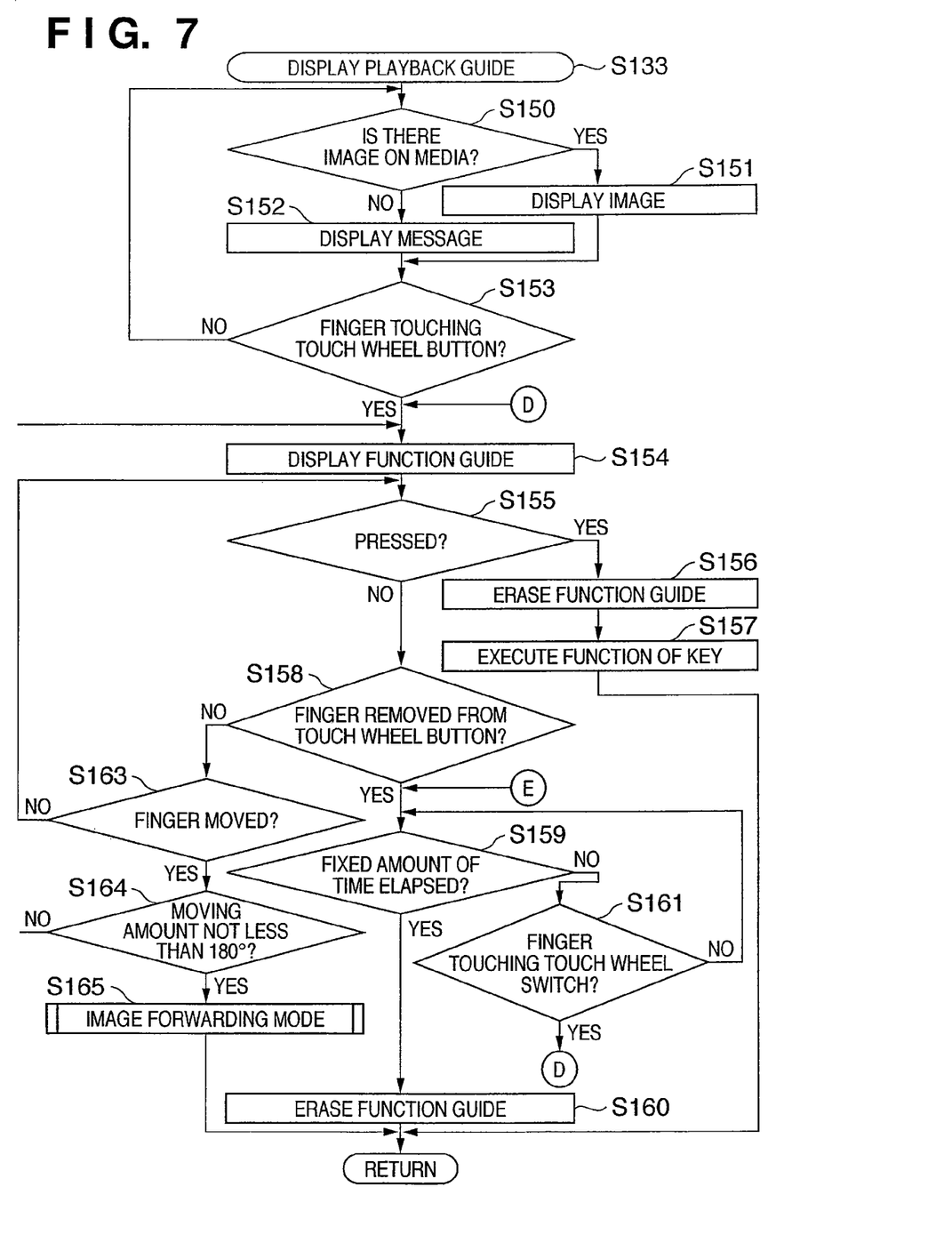
FIG. 7 is a flow chart illustrating a function guide display process carried out in playback mode according to the first embodiment of the present invention.
Figure 8:
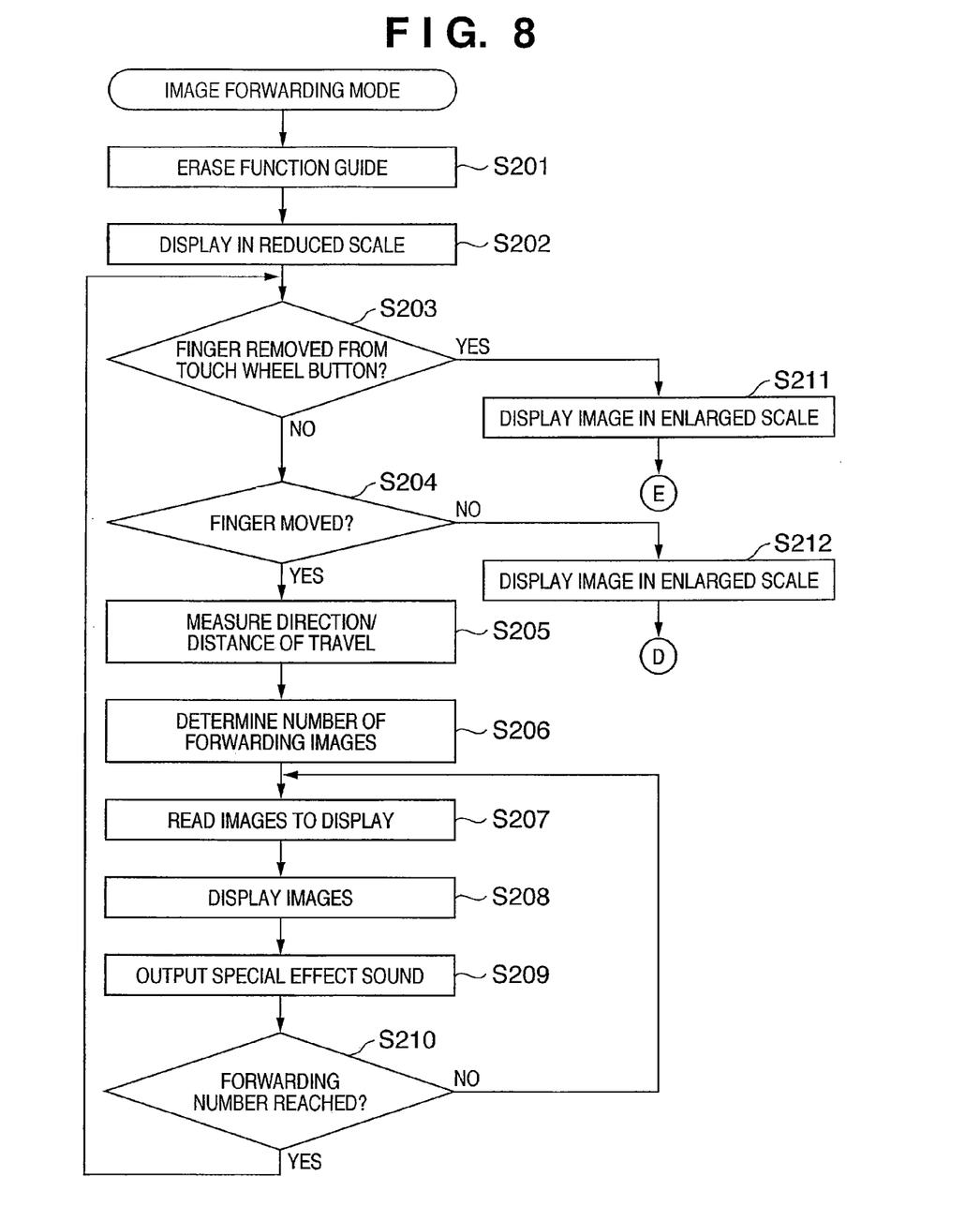
FIG. 8 is a flow chart illustrating an image forwarding mode process carried out in playback mode according to the first embodiment of the present invention.

Detailed explanations addressed to the image forwarding mode executed in step S165 of FIG. 7 are provided next with reference to the flow chart of FIG. 8.

In step S201, the system controller 50 erases the function guide 37 displayed on the image display unit 28 and proceeds to step S202.

In the first embodiment, in the image forwarding mode, a plurality of images are displayed on the image display unit 28 in reduced scale. For this purpose, in step S202, currently displayed images are subjected to scale reduction processing and re-displayed again. For instance, when two reduced-scale images are displayed as shown in FIG. 2E, they are respectively displayed in the top and bottom portion of the screen.

Next, in step S203, the system controller 50 reads the value of the touch wheel sensor 121 and determines whether the finger has been removed from the touch wheel button 36. If the system controller 50 determines that the finger has been removed from the touch wheel button 36, the program proceeds to step S211. In step S211, one of the reduced-scale images is re-displayed in enlarged scale, for instance, it is displayed as shown in FIG. 2A. The program then returns to step S159 of FIG. 7 and marks the time elapsed since the removal of the finger. In such a case, the function guide 37 is not displayed and, therefore, there is not need to carry out the process of step S160 upon lapse of the fixed time after the removal of the finger ("YES" in step S159). On the other hand, if it is determined that the finger has not been removed, the program proceeds to step S204.

In step S204, the system controller 50 reads the value of the touch wheel sensor 121 once again and determines the direction of finger travel on the touch wheel button 36. If it is determined that the finger has moved, the program proceeds to step S205, and if it is determined that it has not moved, to step S212. In step S212, after displaying the image in enlarged scale in the same manner as in step S211, the program returns to step S154 of FIG. 7 and displays the function guide 37.

In step S205, the system controller 50 reads the value of the touch wheel sensor 121 once again and measures the amount of travel and direction of travel of the finger on the touch wheel button 36, storing them in the memory 30.

In step S206, the system controller 50 determines the number of forwarding images based on the amount of travel stored in the memory 30 in step S205.

In step S207, the system controller 50 reads image files from the recording medium 200 or 210 based on the direction of travel stored in the memory 30 in step S205. For instance, if the direction of travel is clockwise, the image files are read in an increasing order, and if the direction of travel is counterclockwise, the image files are read in a decreasing order. It should be noted that the relationship between the direction of travel and the order, in which the image files are read, is not limited to the above.

Next, in step S208, the system controller 50 displays the images read in step S207 on the image display unit 28. At such time, the images are reduced in scale in order to display them alongside the images displayed in reduced scale in step S202. FIG. 2E shows a sample display of images displayed when the direction of travel is counterclockwise and image files are read in a decreasing order. In this case, the previously displayed image a is displayed at the bottom, and the newly read image b is displayed at the top.

In addition, in step S209, an arbitrary sound effect is outputted in order to provide notification of finger travel continuing through 180° and more on the touch wheel button 36.

Next, the system controller 50 decrements the number of forwarding images calculated in step S206 and proceeds to step S203 if its value is 0 (zero) or less ("YES" in step S210), or returns to step S207 and continues displaying the image if it is 1 or more ("NO" in step S210).

For instance, if the number of forwarding images is "3", the number of forwarding images at the end of one cycle of the above-described processing will be "2". Therefore, in step S207 the program reads image c. Then, in step S208, the program moves image b to the bottom (that is, image a is no longer displayed) and displays the newly read image c at the top.

At the end of a second cycle of processing, the number of forwarding images becomes "1". Therefore, the program returns to step S207 once again and repeats processing in the same manner as described above. At the end of a third cycle of processing, the number of forwarding images reaches "0", as a result of which the program returns to step S203 and the above-described processing is repeated.

In Steps S211 or S212, the system controller 50 displays images selected at such time on the image display unit 28 and terminates processing in image forwarding mode.

As described above, the first embodiment makes it possible to execute various functions in playback mode by changing the way the touch wheel button 36 is operated. By doing so, it is possible to configure an image pickup apparatus with a smaller number of operation members and reduced product dimensions without impairing the ease of use. In addition, the user can be informed of the functions allocated to each operation member in a readily intelligible manner because a guide depicting functions allocated to the touch wheel button 36 depending on its current operation state is displayed on the image display unit 28 when the touch wheel button 36 is touched by a finger.

Second Embodiment

A second embodiment of the present invention is explained next.

In the second embodiment, the condition for transition to the image forwarding mode during the playback guide display process is different from the condition explained in step S164 of FIG. 7 in the first embodiment. Because other aspects are identical to the first embodiments, their explanation is omitted, and the explanations below are focused on this point only.

Figure 9:
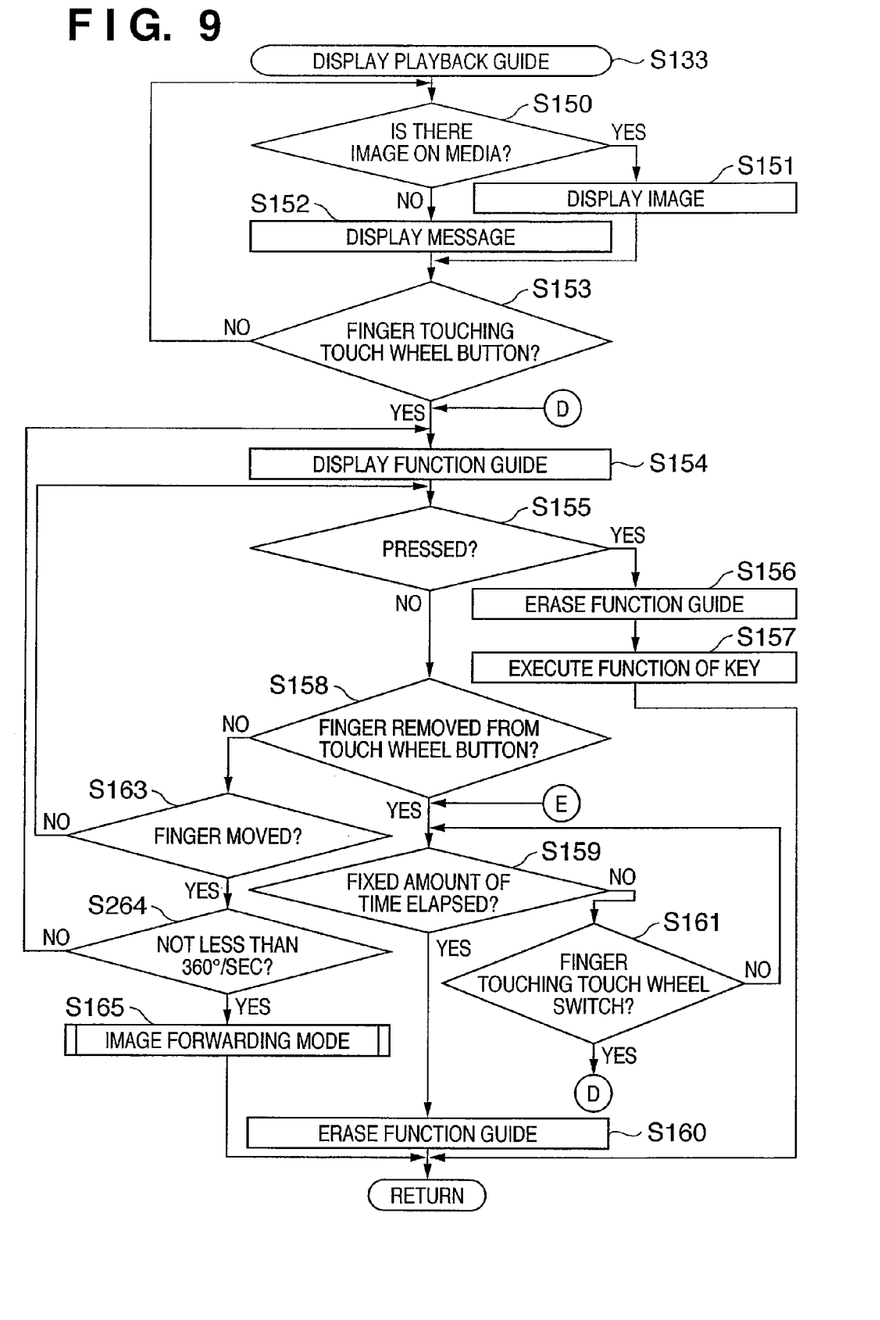
FIG. 9 is a flow chart illustrating a function guide display process carried out in playback mode in the second embodiment of the present invention.

FIG. 9 depicts a flow chart of the playback guide display process used in the second embodiment. In FIG. 9, like reference numbers refer to like processing in FIG. 7.

In the second embodiment, as shown in FIG. 9, the program proceeds to step S264 if it is determined in step S163 that the finger has moved on the touch wheel switch 68. In step S264, the system controller 50 reads the value of the touch wheel sensor 121 again and determines whether the finger has moved at an angular velocity of 360°/sec or more on the touch wheel switch 68. If the system controller 50 determines that the finger has moved at an angular velocity of 360°/sec or more on the touch wheel switch 68, the program proceeds to step S165, makes a transition to the image forwarding mode and terminates the process.

As described above, the second embodiment makes it possible to obtain the same effects as in the first embodiment by changing the way the touch wheel switch 68 operates (moving the finger at an angular velocity of not less than 360°/sec).

Other Embodiments

It should be noted that although the explanations provided in the first and second embodiments were made with reference to cases, in which the present invention was applied to an image pickup apparatus, the present invention is not limited thereto and can be applied to small image processors provided with a display unit and capable of reading and displaying images stored in advance.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-043163, filed on Feb. 20, 2006 which is hereby incorporated by reference herein in their entirety.

What is claimed is:

1. An image processing apparatus comprising:
a display unit that displays an image,
an operation member, arranged at a position different from the display unit, to which a plurality of different functions are allocated respectively in accordance with a plurality of different operation methods,
a touch detection unit that detects an operation of the operation member including a touch to the operation member as a first operation method,
a physical manipulation detection unit that detects an operation of the operation member including a predetermined physical manipulation of the operation member as second operation method, and
a controller that exercises control such that
when said touch detection unit detects that said operation member is touched, a guide showing functions to be executed when said physical manipulation unit detects the manipulation of the operation member is displayed on said display unit together with the image displayed on said display unit before said operation member being operated, and
when said operation member is operated according to a third operation method which is different from the first and second operation methods, an image which is different from the image displayed before said operation member being operated is displayed on said display unit.

2. The image processing apparatus according to claim 1, wherein said controller exercises control such that, when said touch detection unit detects that said operation member is touched, the guide is superimposed on the image displayed before said operation member being operated, and, when said operation member is operated according to the third operation method, a plurality of images generated and stored in advance are displayed simultaneously.

3. The image processing apparatus according to claim 1, wherein the third operation method includes an operation method, in which a continuous moving amount of a touched point on said operation member used for operating said operation member is smaller than a preset threshold value, and an operation method, in which the continuous moving amount of the touched point is not less than the preset threshold value.

4. The image processing apparatus according to claim 3, wherein said controller determines the movement of the touched point based on the touched point detected by said touch detection unit.

5. The image processing apparatus according to claim 3 wherein
said physical manipulation detection unit detects as the predetermined physical manipulation whether said operation member has been pressed, and
said touch detection unit detects a touched point on said operation member,
wherein said controller provides, among a plurality of functions displayed in the guide, an enhanced display of a function to be performed when the operation member is depressed at the touched point detected by said touch detection unit compared to the other functions when said touch detection unit detects that said operation member is touched.

6. The image processing apparatus according to claim 1, wherein the third operation method includes an operation method, in which a rate of travel of a touched point on said operation member used for operating said operation member is not more than a preset threshold value, and an operation method, in which the rate of travel of the touched point is greater than the preset threshold value.

7. The image processing apparatus according to claim 6, wherein said touch detection unit detects the touched point, wherein said controller determines the movement of the touched point based on the touched point detected by said touch detection unit.

8. The image processing apparatus according to claim 6, wherein said physical manipulation detection unit detects as the predetermined physical manipulation whether said operation member has been pressed, and
said apparatus further comprising an execution unit that executes the function allocated to a position of depression of said operation unit in a case where a depression of said operation member is detected by said physical manipulation detection unit during the display of the guide.

9. The image processing apparatus according to claim 6 wherein
said physical manipulation detection unit detects as the predetermined physical manipulation whether said operation member has been pressed; and
said touch detection unit detects a touched point on said operation member,
wherein said controller provides, among a plurality of functions displayed in the guide, an enhanced display of a function to be performed when the operation member is depressed at the touched point detected by said touch detection unit compared to the other functions when said touch detection unit detects that said operation member is touched.

10. The image processing apparatus according to claim 1 wherein said physical manipulation detection unit detects as the predetermined physical manipulation whether said operation member has been pressed, and
said apparatus further comprising an execution unit that executes the function allocated to a position of depression of said operation unit in a case where a depression of said operation member is detected by said physical manipulation detection unit during the display of the guide.

11. The image processing apparatus according to claim 1, wherein in the case where touching to said operation unit has been stopped during display of the guide, said controller continues to provide display of the guide for a prescribed time after stopping the operation.

12. The image processing apparatus according to claim 1, wherein the images are of image files recorded on a recording medium.

13. A control method for an image processing apparatus having a display unit that displays images, an operation member arranged at a position different from the display unit, a touch detection unit that detects an operation of the operation member including a touch to the operation member as a first operation method, and a physical manipulation detection unit that detects an operation of the operation member including a predetermined physical manipulation of the operation member as second operation method, the control method comprising:
a determination step of determining whether the operation member has been touched or whether it has been operated according to a third operation method different from the first and second operation methods,
a first display step of displaying a guide showing functions to be executed when said physical manipulation unit detects the manipulation of the operation member on said display unit together with the image displayed on said display unit before said operation member being operated if it is determined that the operation member is touched,
a second display step of displaying an image which is different from the image displayed before said operation member being operated if it is determined to be the third operation method.

14. The control method according to claim 13, wherein control is exercised such that, if it is determined that the operation member is touched, the guide is superimposed on the image displayed before the operation member being operated, and, if it is determined to be the third operation method, a plurality of images generated and stored in advance are displayed simultaneously.

15. The control method according to claim 13, wherein the third operation method includes an operation method, in which the continuous moving amount of a touched point on the operation member used for operating the operation member is smaller than a preset threshold value, and an operation method, in which the continuous moving amount of the touched point is not less than the preset threshold value.

16. The control method according to claim 15, further comprising a detection step of detecting the touched point by said touch detection unit,
wherein the movement of the touched point is determined based on the touched point detected in said detection step.

17. The control method according to claim 15, further comprising:
a detection step of detecting whether the operation member has been pressed by the physical manipulation detection unit; and
a step of executing the function allocated to a position of depression of the operation unit in a case where a depression of said physical manipulation operation member is detected during the display of the guide.

18. The control method according to claim 15 further comprising:
a first detection step of detecting whether the operation member has been pressed by the physical manipulation detection unit;
a second detection step of detecting a touched point on said operation member by the touch detection unit; and,
a step of providing, among a plurality of functions displayed in the guide, an enhanced display of a function to be performed when the operation member is depressed at the touched point if it is determined that the operation unit is touched.

19. The control method according to claim 13, wherein the third operation method includes an operation method, in which a rate of travel of a touched point on the operation member used for operating the operation member is not more than a preset threshold value, and an operation method, in which the rate of travel of the touched point is greater than the preset threshold value.

20. The control method according to claim 19, further comprising a detection step of detecting the touched point by the touch detection unit,
wherein the travel of the touched point is determined based on the touched point detected in said detection step.

21. The control method according to claims 19, further comprising:
a detection step of detecting whether the operation member has been pressed by the physical manipulation detection unit; and
a step of executing the function allocated to a position of depression of the operation unit in a case where a depression of said operation member is detected by the physical manipulation detection unit during the display of the guide.

22. The control method according to claim 13, further comprising:
a step of determining whether touching to the operation unit has been stopped during display of the guide, and
a step of, in the case where touching to the operation unit has been stopped, continuing the display of the guide for a preset time, and stopping the display of the guide if the prescribed time has elapsed without operation.

23. A recording medium readable by an information processing apparatus, which stores a program executable by the information processing apparatus, comprising a program code used for carrying out the steps of the control method of claim 13.

* * * * *